United States Patent
Yan et al.

(10) Patent No.: US 8,908,622 B2
(45) Date of Patent: Dec. 9, 2014

(54) METHOD AND COMMUNICATION DEVICE FOR ASSIGNING SCHEDULING GRANT

(75) Inventors: Kun Yan, Beijing (CN); Jing Li, Shanghai (CN); Shuju Fan, Shanghai (CN); Yongqiang Gao, Beijing (CN); Xueli Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 13/340,376

(22) Filed: Dec. 29, 2011

(65) Prior Publication Data

US 2012/0099548 A1   Apr. 26, 2012

Related U.S. Application Data

(63) Continuation of application No. PCT/CN2010/074883, filed on Jul. 1, 2010.

(30) Foreign Application Priority Data

Jul. 1, 2009   (CN) .......................... 2009 1 0088051

(51) Int. Cl.
*H04W 28/18* (2009.01)

(52) U.S. Cl.
CPC ................................. *H04W 28/18* (2013.01)
USPC .......................................................... 370/329

(58) Field of Classification Search
CPC .............................. H04W 52/146; H04W 52/16
See application file for complete search history.

(56) References Cited

U.S. PATENT DOCUMENTS

| 8,571,488 | B2* | 10/2013 | Cai et al. .......................... 455/69 |
| 2008/0107197 | A1 | 5/2008 | Jen |
| 2009/0181714 | A1* | 7/2009 | Yajima et al. .................. 455/522 |
| 2010/0035565 | A1* | 2/2010 | Baker et al. ..................... 455/101 |
| 2010/0172395 | A1* | 7/2010 | Sambhwani et al. ......... 375/146 |
| 2010/0296389 | A1* | 11/2010 | Khandekar et al. ........... 370/216 |

FOREIGN PATENT DOCUMENTS

| CN | 101026799 A | 8/2007 |
| CN | 101141779 A | 3/2008 |
| WO | WO 2008/097019 A1 | 8/2008 |
| WO | WO 2009/045026 A2 | 4/2009 |

OTHER PUBLICATIONS

European Search Report received in European Patent Application No. 10793615.5-1249, mailed Jul. 6, 2012, 7 pages.

(Continued)

*Primary Examiner* — Huy D Vu
*Assistant Examiner* — Bao G Nguyen
(74) *Attorney, Agent, or Firm* — Slater & Matsil, L.L.P.

(57) ABSTRACT

The present invention discloses a method and a communication device for assigning a scheduling grant. The method for assigning a scheduling grant includes: receiving a grant value, an E-TFCI offset value, and a data stream identifier corresponding to the E-TFCI offset value, where the E-TFCI offset value is determined by the Node B according to data transmitted by a mobile terminal through two data streams; determining, according to the grant value, a transport block size of the data stream identified by the data stream identifier in a current TTI; and determining a transport block size of the other data stream in the current TTI according to the transport block size and the E-TFCI offset value. in the embodiments of the present invention the MIMO technology may be applied to the HSUPA technology.

14 Claims, 7 Drawing Sheets

(56) References Cited

OTHER PUBLICATIONS

International Search Report and translation received in Patent Cooperation Treaty Application No. PCT/CN2010/074883, mailed Oct. 8, 2010, 8 pages.

Ni, Wei, et al., "Multi-User MIMO Detection for Enhanced High Speed Uplink Packet Access (HSUPA)," The 17$^{th}$ Annual IEEE International Symposium on Personal, Indoor and Mobile Radio Communications, Sep. 2006, 6 pages.

3$^{rd}$ Generation Partnership Project, "Technical Specification Group Radio Access Network; Medium Access Control (MAC) Protocol Specification," 3GPP TS 25.321, V8.6.0, Jun. 2009, 186 pages.

Written Opinion of the International Searching Authority and translation received in Patent Cooperation Treaty Application No. PCT/CN2010/074883, mailed Oct. 8, 2010, 8 pages.

\* cited by examiner

METHOD AND COMMUNICATION DEVICE FOR ASSIGNING SCHEDULING GRANT

CROSS-REFERENCE TO RELATED APPLICATIONS

This application is a continuation of International Application No. PCT/CN2010/074883, filed on Jul. 1, 2010, which claims priority to Chinese Patent Application No. CN 200910088051.3, filed on Jul. 1, 2009, both of which are incorporated herein by reference in its entireties.

FIELD OF THE INVENTION

The present invention relates to communication technologies, and in particular, to a method and communication device for assigning a scheduling grant.

BACKGROUND OF THE INVENTION

A high speed uplink packet access (high speed uplink packet access, HSUPA for short) technology enables optimization and evolution of a packet service in the uplink direction, namely, the direction from a mobile terminal (User Equipment, UE for short) to a radio access network. The HSUPA technology implements enhancements in terms of highest data transmission rate, cell throughput, and delay by using mechanisms such as adaptive coding, physical layer hybrid retransmission, Node B (Node B)-based fast scheduling, and short frame transmission at a 2 ms transport time interval (Transport Time Interval, TTI for short).

Each UE is scheduled according to a packet scheduling principle in conventional HUSPA. The data transmission rate and transmission time of the UE are controlled by the Node B; the Node B determines the current highest transmission rate of the UE according to the cell load, channel quality of the UE, and payload to be transmitted.

Currently, a multiple input multiple output (Multiple Input Multiple Output, MIMO for short) technology is introduced in a downlink direction to improve performance such as throughput of a downlink system. However, in an uplink direction, the spectrum utilization is lower, coverage performance is poorer, and the user peak rate is lower, which need to be further improved.

SUMMARY OF THE INVENTION

The present invention is to provide a method and communication device for assigning a scheduling grant and apply the MIMO technology to the HSUPA technology, in order to improve the spectrum utilization, coverage performance, and user peak rate in an uplink direction and ensure demodulation performance of two data streams at a receiving end after the MIMO technology is used in the uplink direction.

An embodiment of the present invention provides a method for assigning a scheduling grant, including:

receiving a grant value, an enhanced dedicated transport channel transport format combination indication, E-TFCI, offset value, and a data stream identifier corresponding to the E-TFCI offset value, wherein the grant value, the E-TFCI offset value, and the data stream identifier are returned by a Node B and the E-TFCI offset value is determined by the Node B according to data transmitted by a User Equipment through two data streams;

determining, according to the grant value, a transport block size of a data stream in a current transport time interval, TTI, wherein the data stream is identified by the data stream identifier; and determining a transport block size of the other data stream in the current TTI according to the transport block size and the E-TFCI offset value.

In one aspect, the determining, according to the grant value, the transport block size of a data stream in a current TTI, wherein the data stream is identified by the data stream identifier, includes: obtaining, according to the grant value, a grant value of the data stream in the current TTI, wherein the data stream is identified by the data stream identifier; and determining, according to the grant value of the data stream in the current TTI, wherein the data stream is identified by the data stream identifier, a transport block size of the data stream in the current TTI, wherein the data stream is identified by the data stream identifier.

In another aspect, the determining a transport block size of the other data stream in the current TTI according to the transport block size of the data stream identified by the data stream identifier and according to the E-TFCI offset value includes: determining a transport block size of the other data stream in the current TTI according to the transport block size of the data stream identified by the data stream identifier and according to the E-TFCI offset value, when data transmitted through both the two data streams comprises scheduling grant service data or when data transmitted through one of the two data streams comprises scheduling grant service data.

In another aspect, the method further includes: when the data transmitted through the two data streams does not comprise scheduling grant service data, using the transport block size of the data stream in the current TTI, wherein the data stream is identified by the data stream identifier, as the transport block size of the other data stream in the current TTI.

In another aspect, the method further includes: determining transmit power of the two data streams in the current TTI; and in the current TTI, sending data to the Node B respectively through the two data streams with the determined transport block sizes by using the determined transmit power.

An embodiment of the present invention provides another method for assigning a scheduling grant, including:

receiving data transmitted by a UE through two data streams;

assigning a grant value to the UE, and determining an E-TFCI offset value of one data stream in the two data streams according to data transmitted through the two data streams; and returning the grant value, the E-TFCI offset value, and a data stream identifier of the one data stream corresponding to the E-TFCI offset value to the UE.

In one aspect, the determining an E-TFCI offset value of the one data stream according to data transmitted through the two data streams includes: demodulating the data transmitted through the two data streams, and obtaining a demodulation performance difference of the data transmitted through the two data streams; and determining the E-TFCI offset value of the one data stream according to the demodulation performance difference of the data transmitted through the two data streams.

An embodiment of the present invention provides a communication device, including:

a first receiving module, configured to receive a grant value, an E-TFCI offset value, and a data stream identifier corresponding to the E-TFCI offset value, wherein the grant value, the E-TFCI offset value, and the data stream identifier are returned by a Node B and the E-TFCI offset value is determined by the Node B according to data transmitted by the communication device through two data streams;

a first determining module, configured to determine, according to the grant value received by the first receiving module, a transport block size of a data stream in a current TTI, wherein the data stream is identified by the data stream identifier; and a second determining module, configured to determine a transport block size of the other data stream in the current TTI according to the transport block size determined by the first determining module and the E-TFCI offset value received by the first receiving module.

In one aspect, the first determining module includes: a first obtaining unit, configured to obtain, according to the grant value received by the first receiving module, a grant value of the data stream in the current TTI, wherein the data stream is identified by the data stream identifier; and a first determining unit, configured to determine, according to the grant value obtained by the first obtained unit, the transport block size of the data stream in the current TTI, wherein the data stream is identified by the data stream identifier.

In another aspect, the communication device further includes: an identifying module, configured to identify whether the data transmitted through the two data streams in the current TTI comprises scheduling grant service data; wherein the second determining module is configured to determine a transport block size of the other data stream in the current TTI according to the transport block size determined by the first determined module and according to the E-TFCI offset value, when the identifying module identifies that the data transmitted through both the two data streams comprises scheduling grant service data or that the data transmitted through one of the two data streams comprises scheduling grant service data.

In another aspect, the communication device further includes: a third determining module, configured to use the transport block size determined by the first determined module as the transport block size of the other data stream in the current TTI, when the identifying module identifies that the data transmitted through the two data streams does not comprise scheduling grant service data.

In another aspect, the communication device further includes: a fourth determining module, configured to determine transmit power of the two data streams in the current TTI, according to the transport block size determined by the first determined module; and a first sending module, configured to send data to the Node B in the current TTI by using the determined transmit power determined by the fourth determining module, respectively through the two data streams with the transport block sizes determined respectively by the first determining module and the second determining module.

An embodiment of the present invention provides another communication device, including:

a second receiving module, configured to receive data transmitted by a UE through two data streams;

an assigning module, configured to assign a grant value to the UE;

a fifth determining module, configured to determine an E-TFCI offset value of one data stream in the two data streams according to the data received by the second receiving module; and a second sending module, configured to send the grant value assigned by the assigning module, the E-TFCI offset value determined by the fifth determining module, and a data stream identifier of the one data stream corresponding to the E-TFCI offset value to the mobile terminal.

In one aspect, the fifth determining module includes: a demodulating unit, configured to demodulate the data received by the second receiving module; a second obtaining unit, configured to obtain a demodulation performance difference of the data received by the second receiving module; and a second determining unit, configured to determine the E-TFCI offset value of the data stream according to the demodulation performance difference obtained by the second obtaining unit.

Based on the method and communication device for assigning a scheduling grant according to the embodiments of the present invention, the MIMO technology may be applied to the HSUPA technology and uplink data is transmitted through two data streams, in order to improve the spectrum utilization, coverage performance, and user peak rate in the uplink direction, implement scheduling grant assignment for the two data streams, and ensure demodulation performance of data transmitted through the two data streams at a receiving end after the HSUPA technology is used in the uplink direction.

The technical solutions of the embodiments of the present invention are hereinafter described in detail with reference to accompanying drawings and embodiments.

DETAILED DESCRIPTION OF THE EMBODIMENTS

Because with the MIMO technology, the capacity and spectrum utilization of the communication system may increase several-fold without increase of bandwidth, the MIMO technology is applied to the HSUPA technology, and uplink data is transmitted through two data streams, in order to improve the uplink spectrum utilization and increase the uplink coverage rate and user peak rate. After the MIMO technology is applied to the HSUPA technology, a UE may transmit two data blocks to a Node B in a same TTI simultaneously, that is, transmit data to the Node B through two data streams. The process is also called dual-stream data transmission.

When the UE is in MIMO mode and transmits uplink data to the Node B through two data streams, if the UE receives an absolute grant value or a relative grant value delivered by the Node B for the entire UE, or, two same grant values assigned for the two data streams, because of differences in many aspects such as channel condition, the two data streams sent by the UE using same grant values may have demodulation performance differences at a receiving end, which thereby affects correct decoding of data. Therefore, it is necessary to adjust transport block sizes of the two data streams to ensure that the uplink data transmitted through the two data streams has the same or similar demodulation performance.

Figure 1:
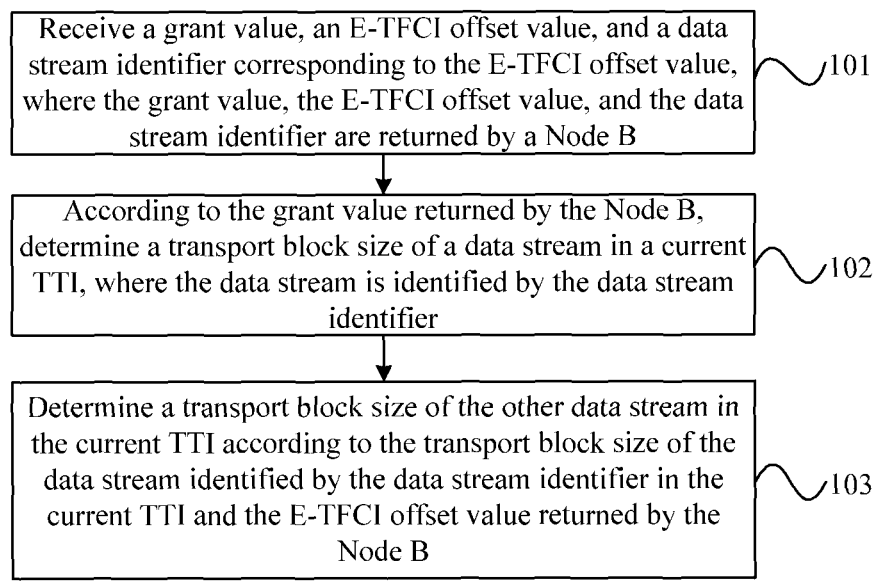
FIG. 1 is a flowchart of an embodiment of a method for assigning a scheduling grant according to the present invention.

FIG. 1 is a flowchart of an embodiment of a method for assigning a scheduling grant according to the present invention, and the procedure in the embodiment may be implemented by a UE specifically. As shown in FIG. 1, this embodiment includes the following steps:

Step 101: Receive a grant value, an enhanced dedicated transport channel (Enhanced Dedicated Transport Channel, E-DCH for short) transport format combination indication (E-TFC Indication, E-TFCI for short) offset value, and a data stream identifier corresponding to the E-TFCI offset value, where the grant value, the E-TFCI offset value, and the data stream identifier are returned by a Node B and the E-TFCI offset value is determined by the Node B according to the data transmitted by a mobile terminal through two data streams.

According to a specific embodiment of the present invention, the E-TFCI offset value may be generated by the Node B according to the data transmitted through two data streams, in a TTI before a current TTI, or generated by the Node B according to the data transmitted through two data streams, in a RTT before a current round trip time (Route-Trip Time, RTT), or generated by the Node B at any other time after the Node B receives the data transmitted by the mobile terminal through two data streams.

Step 102: According to the grant value returned by the Node B, determine a transport block size of the data stream in the current TTI, where the data stream is identified by the data stream identifier and an index corresponding to the transport block size may be represented by an E-TFCI.

Step 103: Determine a transport block size of the other data stream in the current TTI according to the transport block size of the data stream in the current TTI, where the data stream is identified by the data stream identifier, and according to the E-TFCI offset value returned by the Node B.

After the E-TFCI of the data stream identified by the data stream identifier is determined, an E-TFCI of the other data stream may be determined according to the E-TFCI offset value returned by the Node B for the two data streams, so that the E-TFCI of the other data stream is adjusted. Thereby, in a case that transmit power of two data streams is the same, it may be ensured that the data transmitted through the two data streams has the same or similar demodulation performance at a receiving end, which effectively guarantees correct decoding of data by the receiving end.

Figure 2:
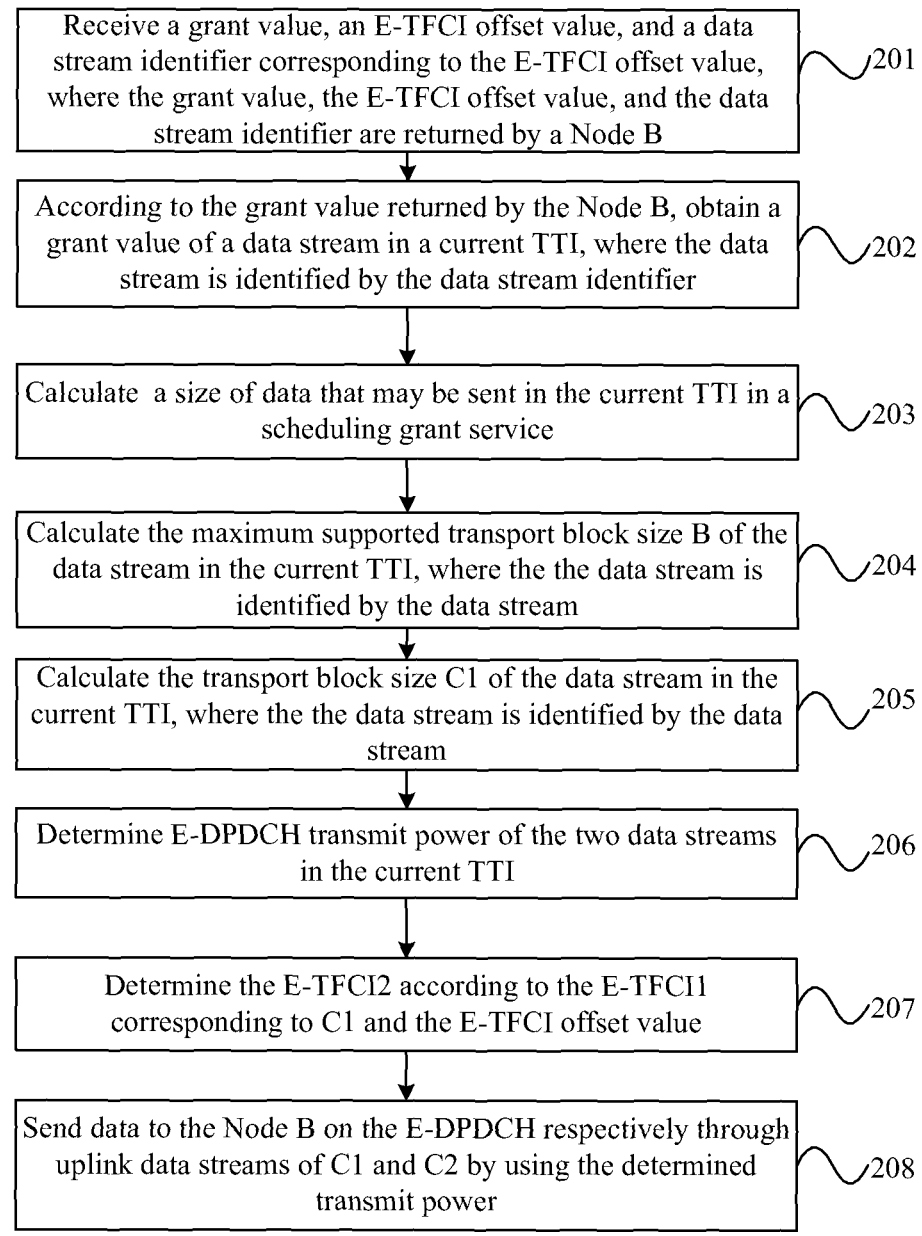
FIG. 2 is a flowchart of another embodiment of a method for assigning a scheduling grant according to the present invention.

FIG. 2 is a flowchart of another embodiment of a method for assigning a scheduling grant according to the present invention, and the procedure in the embodiment may also be implemented by a UE specifically. As shown in FIG. 2, this embodiment includes the following steps:

Step 201: Receive a grant value, an E-TFCI offset value, and a data stream identifier corresponding to the E-TFCI offset value, where the grant value, the E-TFCI offset value, and the data stream identifier are returned by a Node B.

The E-TFCI offset value is generated by the Node B according to data transmitted by a mobile terminal through two data streams and is used for calculating transport block sizes of the two data streams in a current TTI. The two data streams include a data stream identified by the data stream identifier and the other data stream.

Step 202: According to the grant value returned by the Node B, obtain the grant value of the data stream in the current TTI, where the data stream is identified by the data stream identifier and the grant value is also the grant value of a hybrid automatic repeat request (Hybrid Automatic Repeat Request, HARQ for short) process corresponding to the data stream.

Specifically, if the grant value returned by the Node B is one grant value assigned for the UE, a half value of the grant value is used as the grant value of the data stream in the current transport time interval (Transport Time Interval, TTI for short), where the data stream is identified by the data stream identifier. If the grant values returned by the Node B are two same grant values assigned for two data streams, the grant value is used directly as the grant value of the data stream in the current TTI, where the data stream is identified by the data stream identifier.

Step 203: According to the grant value determined in step 202 and the scheduling manner used by the UE, determine a calculation formula of a E-TFC selection process, and according to the calculation formula, calculate a size of data that may be sent in the current TTI in a scheduling grant service, assuming the data size is a.

Step 204: According to the maximum available transmit power of the UE, and the transmit power of an uplink physical channel being used other than an E-DCH dedicated physical data channel (E-DCH Dedicated Physical Data Channel, E-DPDCH), calculate the remaining transmit power that may be used as the E-DPDCH transmit power, and according to the half value of the remaining transmit power, use an E-TFC restriction process to calculate the transport block size supported by the data stream in the current TTI, where the data stream is identified by the data stream identifier, assuming the calculated transport block size is B.

In other embodiments of the present invention, step 204 may be performed before step 203 or performed with step 203 concurrently.

Step 205: According to a total data size to be transmitted in the current TTI by the data stream identified by the data stream identifier, a maximum supported transport block size B, and the size a of data that may be sent in a scheduling grant service, the UE determines the transport block size of the data stream in the current TTI, where the data stream is identified by the data stream identifier and the transport block size may be represented by C1, and a corresponding index may be represented by E-TFCI1.

Specifically, assuming the total data size to be transmitted in the current TTI by the data stream identified by the data stream identifier is represented by A, if only scheduling grant service data needs to be transmitted, the total data size A to be transmitted in the current TTI by the data stream identified by the data stream identifier is equal to the size a of scheduling grant service data, that is, A=a. In addition, the total data size A to be transmitted is compared with the transport block size B calculated by using an E-TFC restriction process, and the transport block size of the data stream in the current TTI, where the data stream is identified by the data stream identifier, is determined as $C1=\min\{A, B\}$.

If the data stream identified by the data stream identifier needs in the current TTI to transmit non-scheduling grant service data and/or scheduling information (scheduling information, SI for short) in addition to scheduling grant service data, assuming the size of the non-scheduling grant service data to be transmitted is represented by b and the size of the SI to be transmitted is represented by c, the total data size A to be transmitted in the current TTI by the data stream identified by the data stream identifier is equal to the size a of scheduling grant service data plus the size b of non-scheduling grant service data to be transmitted and/or the size of the SI, that is, A=a+b+c, or A=a+b, or A=a+c. The total data size A to be transmitted in the current TTI by the data stream identified by the data stream identifier is compared with the transport block size B calculated by using the E-TFC restriction process, and the transport block size of the data stream in the current TTI, where the data stream is identified by the data stream identifier, is determined as C1=min{A, B}. If the total data size A to be transmitted in the current TTI exceeds the transport block size B calculated by using the E-TFC restriction process, the size of scheduling grant service data in A is decreased so that the data is transmitted according to the transport block size.

Step 206: According to the determined transport block size C1 of the data stream in the current TTI, where the data stream is identified by the data stream identifier, calculate a corresponding E-DPDCH power offset factor, and thereby determine the E-DPDCH transmit power of the data stream in the current TTI, where transmit power of the other data stream in the two data streams is the same as this transmit power.

Step 207: According to the determined index E-TFCI1 corresponding to the transport block size C1 of the data stream in the current TTI, where the data stream is identified by the data stream identifier, and according to the E-TFCI offset value returned by the Node B, determine the transport block size C2 of the other data stream in the current TTI, where an index corresponding to the transport block size C2 is represented by E-TFCIC2.

Specifically, according to presetting, in step 201, the data stream identified by the data stream identifier may be a data stream transmitting data with better demodulation performance in the two data streams, and in this case, the E-TFCI offset value returned by the Node B is a value greater than or equal to zero. Accordingly, in step 207, the difference between the E-TFCI1 corresponding to the transport block size C1 of the data stream in the current TTI, where the data stream is identified by the data stream identifier, and the E-TFCI offset value may be calculated, that is, E-TFCI1−E-TFCI offset value, and the obtained difference, E-TFCI1−E-TFCI offset value, is used as the index E-TFCI2 corresponding to the transport block size C2 of the other data stream in the current TTI, where the other data stream is a data stream with poorer transmission and demodulation performance in the two data streams.

When the data stream identified by the data stream identifier is a data stream transmitting data with better demodulation performance in the two data streams, the difference between the E-TFCI1 corresponding to the transport block size C1 of the data stream and the E-TFCI offset value is used as the E-TFCI2 corresponding to the transport block size C2 of the data stream transmitting data with poorer demodulation performance. That is, when the transmit power is fixed, the number of bits transmitted by the data stream transmitting data with poorer demodulation performance is decreased, and the energy for every transmitted bit is increased. Therefore, the demodulation performance of the data stream transmitting data with poorer demodulation performance may be improved effectively, so that the two data streams have the same or similar demodulation performance at a receiving end.

In addition, according to presetting, in step 201, the data stream identified by the data stream identifier is a data stream transmitting data with poorer demodulation performance in the two data streams, and in this case, the E-TFCI offset value returned by the Node B is a value less than or equal to zero. Accordingly, in step 207, the difference between the E-TFCI1 corresponding to the transport block size C1 of the data stream in the current TTI, where the data stream is identified by the data stream identifier, and the E-TFCI offset value may be calculated, that is, E-TFCI1−E-TFCI offset value, and the obtained difference, E-TFCI1−E-TFCI offset value, is used as the E-TFCI2 corresponding to the transport block size C2.

In addition, according to presetting, the E-TFCI2 corresponding to the transport block size C2 may also be determined in other ways according to the E-TFCI1 corresponding to the transport block size C1 and according to the E-TFCI offset value returned by the Node B.

In other embodiments of the present invention, step 207 may be performed before step 206 or performed with step 206 concurrently.

Step 208: In the current TTI, send data to the Node B on the E-DPDCH respectively through uplink data streams of the transport block size C1 corresponding to E-TFCI1 and of transport block size C2 corresponding to E-TFCI2 by using the transmit power determined in step 205.

In another embodiment of the present invention, after the grant value, E-TFCI offset value, and data stream identifier corresponding to the E-TFCI offset value, where the grant value, the E-TFCI offset value, and the data stream identifier are returned by a Node B, are received in step 201, it may also be identified first whether the data transmitted through two data streams in the current TTI includes scheduling grant service data. When the data transmitted through both the two data streams includes scheduling grant service data, or the data transmitted through one data stream includes scheduling grant service data, the E-TFCI2 corresponding to the transport block size C2 is determined in step 207 according to the E-TFCI1 corresponding to the transport block size C1 and according to the E-TFCI offset value. Otherwise, if the data sent through the two data streams in the current TTI does not include scheduling grant service data, the E-TFCI1 corresponding to the transport block size C1 may be directly used as the E-TFCI2 corresponding to the transport block size C2 of the other data stream.

Figure 3:
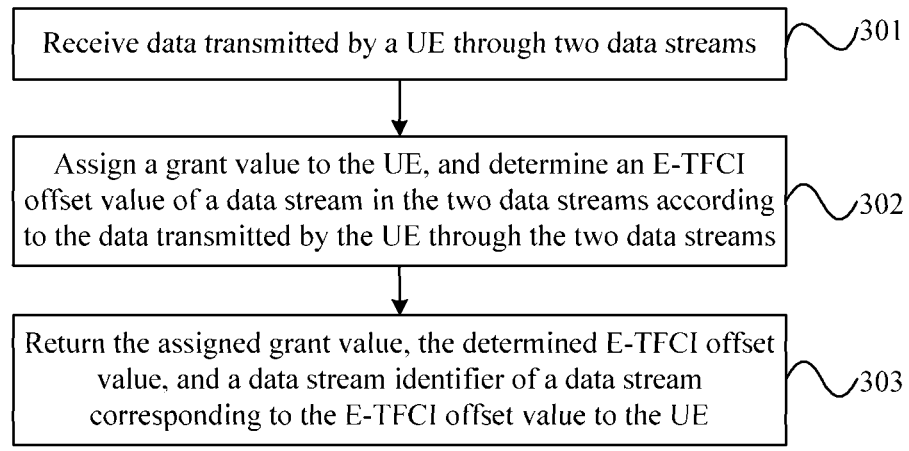
FIG. 3 is a flowchart of still another embodiment of a method for assigning a scheduling grant according to the present invention.

FIG. 3 is a flowchart of another embodiment of a method for assigning a scheduling grant according to the present invention, and the procedure in the embodiment may be implemented by a Node B specifically. As shown in FIG. 3, this embodiment includes the following steps:

Step 301: Receive data sent by a UE through two data streams. Specifically, each data stream carries a data stream identifier for identifying the data stream.

Step 302: Assign a grant value to the UE, and determine an E-TFCI offset value of one data stream in the two data streams according to the data transmitted by the UE through the two data streams.

Specifically, according to presetting, the one data stream with the determined E-TFCI offset value may be: a data stream transmitting data with better or poorer demodulation performance in the two data streams, or either data stream in the two preset data streams.

In an embodiment of the present invention, assigning a grant value to the UE may be: assigning an absolute grant value or assigning a relative grant value relative to the grant value of a HARQ process, where the grant value of the HARQ process is assigned to the UE in a previous RTT, to the UE; or assigning two same grant values to the two data streams respectively, where the grant values are absolute grant values or are relative grant values relative to the grant value of a HARQ process, where the grant value of the HARQ process is assigned to the UE in a previous RTT.

Step 303: Return the assigned grant value, determined E-TFCI offset value, and data stream identifier of a data stream corresponding to the E-TFCI offset value to the UE.

The Node B determines the E-TFCI offset value of one data stream in the two data streams according to the data transmitted by the two data streams and sends the E-TFCI offset value to the UE, so that the UE determines, according to the E-TFCI offset value, an E-TFCI corresponding to the transport block size of the other data stream in the current TTI, which thereby implements adjustment of the E-TFCI corresponding to the transport block size of the other data stream in the current TTI, that is, adjusting the transport block size of the other data stream in the current TTI. In this way, when two data streams have the same transmit power, it may be ensured that the data transmitted through the two data streams has the same or similar demodulation performance at a receiving end, and it is effectively guaranteed that the receiving end correctly decodes the data transmitted by the two streams.

In an embodiment of the present invention, in step 302, the E-TFCI offset value corresponding to the transport block size of one data stream in the two data streams in the current TTI may be determined according to the data transmitted through the two data streams, by using the following method: demodulating the data transmitted through the two data streams, and comparing demodulation performance of the data transmitted through the two data streams to obtain a demodulation performance difference of the data transmitted through the two data streams; determining the E-TFCI offset value of the one data stream according to the demodulation performance difference of the data transmitted through the two data streams.

When the E-TFCI offset value of the one data stream is determined according to the demodulation performance difference of the data transmitted through the two data streams, the E-TFCI corresponding to the transport block size of the other data stream in the current TTI is adjusted according to the E-TFCI offset value, which may more directly and more precisely control the demodulation performance of the data transmitted through the two data streams in the current TTI and ensure the demodulation performance to be the same or similar.

Figure 4:
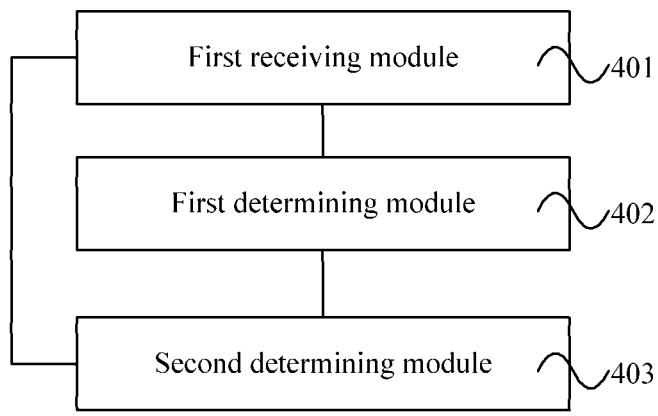
FIG. 4 is a schematic structural diagram of an embodiment of a communication device according to the present invention.

FIG. 4 is a schematic structural diagram of an embodiment of a communication device according to the present invention, where the communication device in the embodiment may serve as a UE and implement the procedure in the embodiment shown in FIG. 1 or FIG. 2 of the present invention. As shown in FIG. 4, the communication device of the embodiment includes a first receiving module 401, a first determining module 402, and a second determining module 403.

The first receiving module 401 is configured to receive a grant value, an E-TFCI offset value, and a data stream identifier corresponding to the E-TFCI offset value, where the grant value, the E-TFCI offset value, and the data stream identifier are returned by a Node B. The E-TFCI offset value is determined by the Node B according to the data transmitted by the UE through two data streams. According to a specific embodiment of the present invention, the E-TFCI offset value may be generated by the Node B according to the data transmitted through two data streams, in a TTI before a current TTI, or may be generated by the Node B according to the data transmitted through two data streams, in an RTT before a current RTT. The first determining module 402 is configured to determine, according to the grant value received by the first receiving module 401, the transport block size of a data stream in the current TTI, where the data stream is identified by the data stream identifier and a corresponding index may be represented by E-TFCI1. The second determining module 403 is configured to determine a transport block size of the other data stream in the current TTI, according to the transport block size determined by the first determining module 402 and the E-TFCI offset value received by the first receiving module 401, where the corresponding index may be represented by E-TFCI2.

Figure 5:
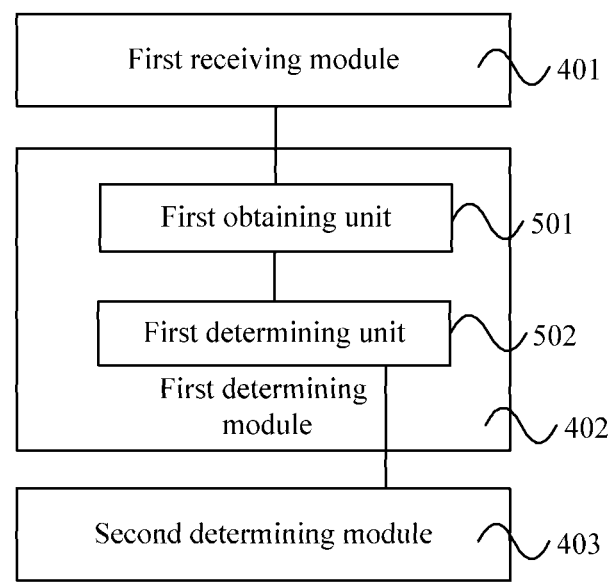
FIG. 5 is a schematic structural diagram of another embodiment of a communication device according to the present invention.

FIG. 5 is a schematic structural diagram of another embodiment of a communication device according to the present invention, where the communication device in the embodiment may serve as a UE and implement the procedure in the embodiment shown in FIG. 1 or FIG. 2 of the present invention. Compared with the embodiment shown in FIG. 4, in the communication device of the embodiment, the first determining module 402 includes a first obtaining unit 501 and a first determining unit 502.

The first obtaining unit 501 is configured to obtain, according to a grant value received by the first receiving module 401, a grant value of a data stream identified by a data stream identifier in the current TTI, where the obtained grant value is also a grant value of a HARQ process corresponding to the data stream. The first determining unit 502 is configured to determine, according to the grant value of the data stream in the current TTI, where the data stream is identified by the data stream identifier, the transport block size of the data stream in the current TTI, where the data stream is identified by the data stream identifier.

Figure 6:
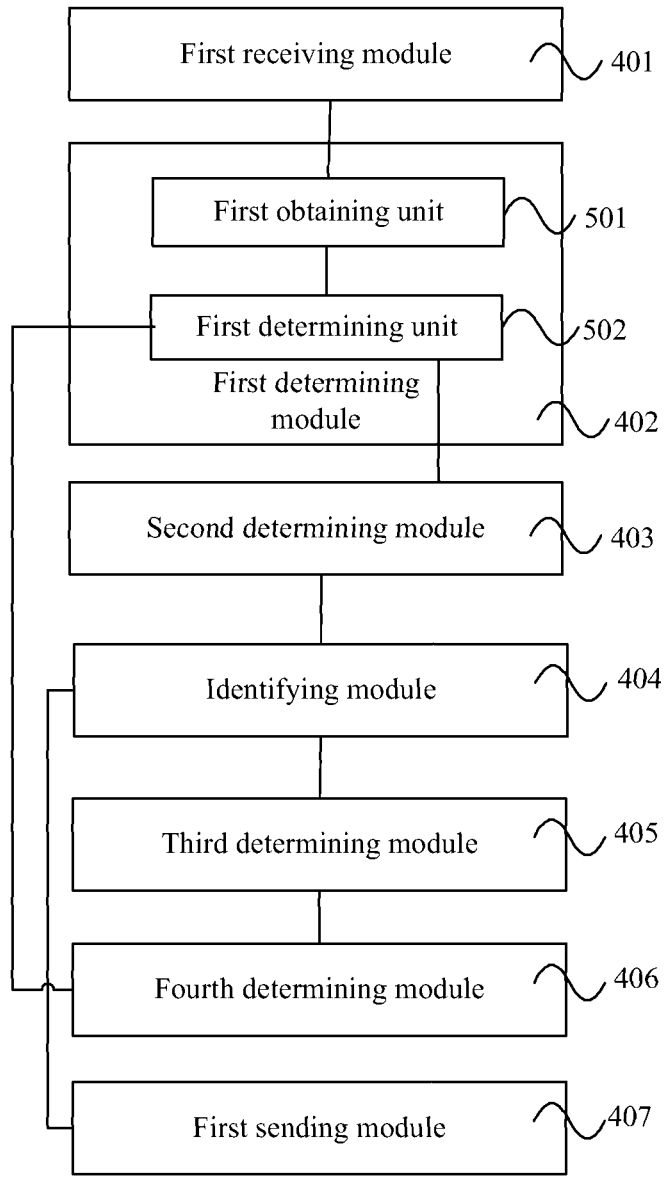
FIG. 6 is a schematic structural diagram of still another embodiment of a communication device according to the present invention.

FIG. 6 is a schematic structural diagram of still another embodiment of a communication device according to the present invention, where the communication device in the embodiment may serve as a UE and implement the procedure in the embodiment shown in FIG. 1 or FIG. 2 of the present invention. Compared with the embodiment shown in FIG. 4 or FIG. 5, the communication device of the embodiment further includes an identifying module 404. The identifying module 404 is configured to identify whether data transmitted through two data streams in a current TTI includes scheduling grant service data. Accordingly, the second determining module 403 determines, according to the E-TFCI1 corresponding to the transport block size C1 determined by the first determining module 402 and the E-TFCI offset value received by the first receiving module 401, an E-TFCI2 corresponding to a transport block size C2 of the other data stream in the current TTI, specifically according to the identification result of the identifying module 404, when the data transmitted through both the two data streams in the current TTI includes scheduling grant service data or when the data transmitted through one of the two data streams in the current TTI includes scheduling grant service data.

As shown in FIG. 6, the communication device in the embodiment of the present invention may further include a third determining module 405, configured to directly use the E-TFCI1 as the E-TFCI2 corresponding to the transport block size C2 of the other data stream in the current TTI, according to the identification result of the identifying module 404, when the data transmitted through the two data streams in the current TTI does not include scheduling grant service data.

Still as shown in FIG. 6, the communication device in the embodiment of the present invention may further include a fourth determining module 406 and a first sending module 407. The fourth determining module 406 is configured to determine transmit power of the two data streams in the current TTI according to the E-TFCI1 corresponding to the transport block size C1 determined by the first determining module 402. The first sending module 407 is configured to transmit data to the Node B in the current TTI by using the transmit power determined by the fourth determining module 406, respectively through uplink data streams with the transport block size C1 corresponding to the E-TFCI1 and the transport block size C2 corresponding to the E-TFCI2.

Figure 7:
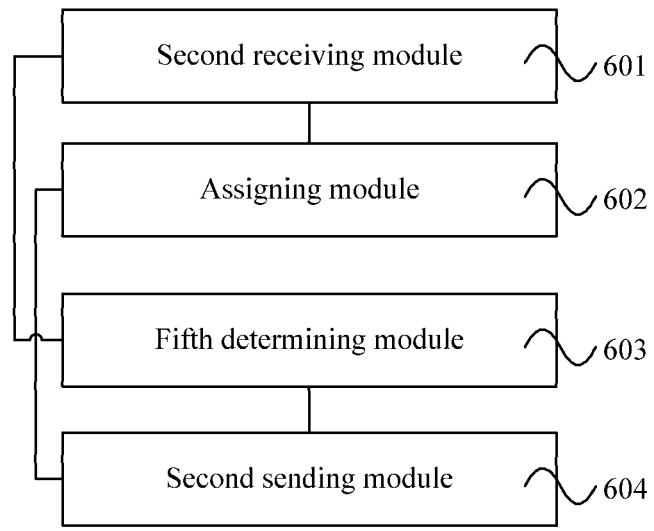
FIG. 7 is a schematic structural diagram of yet another embodiment of a communication device according to the present invention.

FIG. 7 is a schematic structural diagram of yet another embodiment of a communication device according to the present invention, where the communication device in the embodiment may serve as a Node B and implement the procedure in the embodiment shown in FIG. 3 of the present invention. As shown in FIG. 7, the communication device of the embodiment includes a second receiving module 601, an assigning module 602, a fifth determining module 603, and a second sending module 604.

The second receiving module 601 is configured to receive data transmitted by a UE through two data streams. The assigning module 602 is configured to assign a grant value to the UE after the second receiving module 601 receives the data transmitted by the UE through the two data streams. The fifth determining module 603 is configured to determine an E-TFCI offset value of one data stream in the two data streams according to the data that is transmitted through the two data streams and received by the second receiving module 601. The second sending 604 is configured to send the grant value assigned by the assigning module 602, the E-TFCI offset value determined by the fifth determining module 603, and a data stream identifier of a data stream corresponding to the E-TFCI offset value to the UE.

In an embodiment of the present invention, the assigning module 602 may assign an absolute grant value or assign a relative grant value relative to a grant value of a HARQ process, where the grant value of a HARQ process is assigned to the UE in the previous RTT, to the UE. In addition, the assigning module 602 may also assign two same grant values to the two data streams respectively, where the grant values may be absolute grant values, or may be relative grant values relative to a grant value of a HARQ process, where the grant value of a HARQ process is assigned to the UE in the previous RTT.

Figure 8:
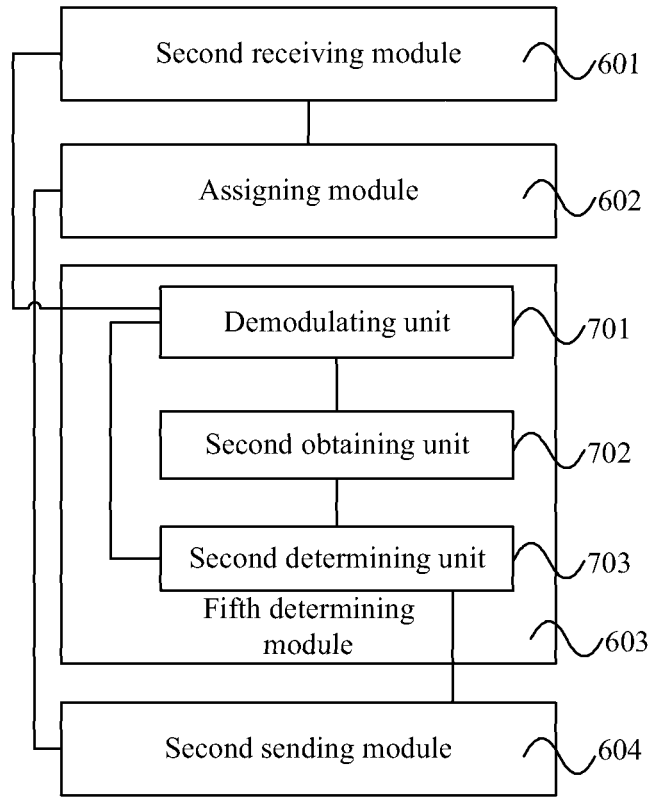
FIG. 8 is a schematic structural diagram of still another embodiment of a communication device according to the present invention.

FIG. 8 is a schematic structural diagram of still another embodiment of a communication device according to the present invention, where the communication device in the embodiment may also serve as a Node B and implement the procedure in the embodiment shown in FIG. 3 of the present invention. Compared with the embodiment shown in FIG. 7, in the communication device of the embodiment, a fifth determining module 603 includes a demodulating unit 701, a second obtaining unit 702, and a second determining unit 703. The demodulating unit 701 is configured to demodulate data that is transmitted by a UE through two data streams and received by a second receiving module 601. The second obtaining unit 702 is configured to obtain, according to the demodulation result of the demodulating unit 701, a demodulation performance difference of the data transmitted through the two data streams. The second determining unit 703 is configured to determine the E-TFCI offset value of the one data stream according to the demodulation performance difference obtained by the second obtaining unit 702.

An embodiment of the present invention provides a communication system, including a Node B and a UE. The Node B is configured to: receive data transmitted by the UE through two data streams; assign a grant value to the UE, and determine an E-TFCI offset value of one data stream in the two data streams according to the data transmitted through the two data streams; and return the grant value, the E-TFCI offset value, and a data stream identifier of a data stream corresponding to the E-TFCI offset value to the UE. Specifically, the Node B may be implemented through any embodiment shown in FIG. 7 or FIG. 8.

Figure 9:
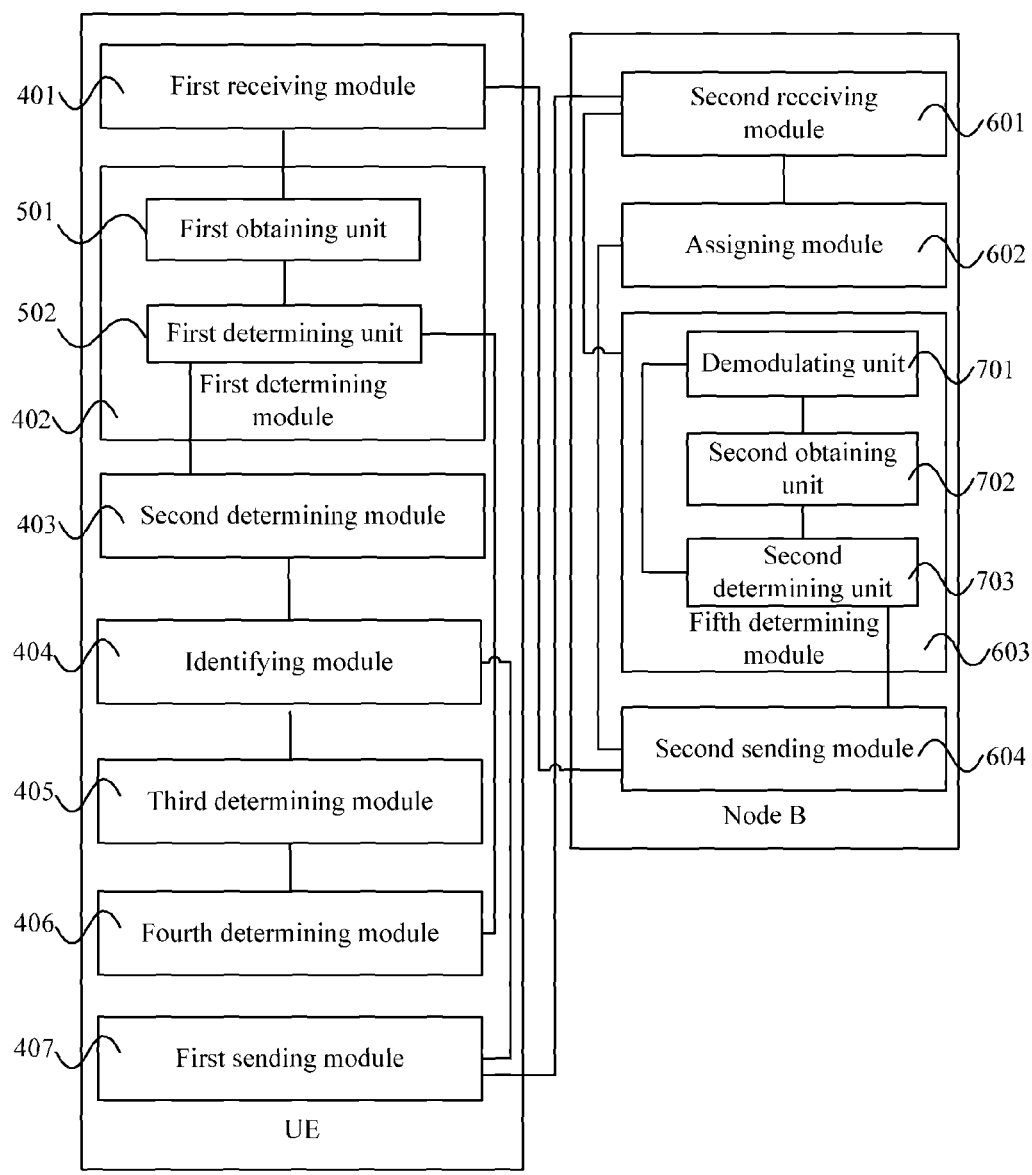
FIG. 9 is a schematic structural diagram of an embodiment of a communication system according to the present invention.

The UE is configured to: receive the grant value, E-TFCI offset value, and data stream identifier of a data stream corresponding to the E-TFCI offset value, where the grant value, the E-TFCI offset value, and the data stream identifier are returned by the Node B; determine the transport block size of the data stream in a current TTI, where the data stream is identified by the data stream identifier; and determine the transport block size of the other data stream in the current TTI according to the determined transport block size and according to the E-TFCI offset value returned by the Node B. Specifically, the UE may be implemented through any one of embodiments shown in FIG. 4 to FIG. 6. FIG. 9 is a schematic structural diagram of an embodiment of a communication system according to the present invention. In the embodiment, the Node B is implemented by using the embodiment shown in FIG. 8, and the UE is implemented by using the embodiment shown in FIG. 6.

Persons of ordinary skill in the art may understand that all or part of the steps in the methods according to the embodiments may be implemented by a program instructing hardware. The program may be stored in a computer readable storage medium and when the program is run, the steps in the methods of the embodiments are included. The storage medium may be any medium that can store program codes, such as a ROM, a RAM, a magnetic disk, or an optical disk.

In the embodiments of the present invention, the MIMO technology may be applied to the HSUPA technology. Uplink data is transmitted through two data streams to improve uplink spectrum utilization and improve uplink coverage performance and a user peak rate, and the transport block sizes of the two data streams are adjusted through a grant value. Therefore, after the HSUPA technology is used in the uplink direction, it is ensured that the data transmitted through the two data streams has the same or similar demodulation performance at a receiving end, and it is effectively guaranteed that the receiving end correctly decodes the two data streams.

Finally, it should be noted that the foregoing embodiments are intended to illustrate rather than to limit the technical solution of the present invention. Although the present invention is described in detail with reference to exemplary embodiments, persons of ordinary skill in the art should understand that modifications and substitutions may be made to the technical solution of the present invention without departing from the spirit and scope of the present invention.

What is claimed is:

1. A method for assigning a scheduling grant, comprising:
    receiving a grant value, an enhanced dedicated transport channel transport format combination indication (E-TFCI) offset value, and a data stream identifier corresponding to the E-TFCI offset value, wherein the grant value, the E-TFCI offset value, and the data stream identifier are returned by a Node B, and wherein the E-TFCI offset value is determined by the Node B according to data transmitted by a User Equipment through two data streams;
    setting transport block sizes for the two data streams in accordance with the E-TFCI offset value such that the two data streams exhibit similar demodulation performance, wherein setting the transport block sizes comprises determining a first transport block size for carrying a first data stream in a current transport time interval (TTI) according to the grant value, and determining a second transport block size for carrying a second data stream in the TTI according to the first transport block size and the E-TFCI offset value; and
    communicating, over the TTI, the first data stream using the first transport block size and the second data stream using the second transport block size, wherein the first data stream and the second data stream exhibit similar demodulation performance by virtue of a difference in transport block sizes specified by the E-TFCI offset value.

2. The method according to claim 1, wherein determining the first transport block size comprises:
obtaining, according to the grant value, a grant value of the first data stream in the TTI; and
determining the first transport block size according to the grant value of the first data stream in the TTI.

3. The method according to claim 1, wherein determining the second transport block size comprises:
determining the second transport block size according to the E-TFCI offset value when data transmitted through at least one of the two data streams comprises scheduling grant service data.

4. The method according to claim 3, wherein the method further comprises: when the data transmitted through the two data streams does not comprise scheduling grant service data, using the first transport block size to carry the second data stream.

5. The method according to claim 1, further comprising:
determining transmit power of the two data streams in the TTI; and
in the TTI, sending data to the Node B respectively through the two data streams with the determined transport block sizes using the determined transmit power.

6. A method for assigning a scheduling grant, comprising:
receiving data transmitted by a User Equipment (UE) through two data streams;
assigning a grant value to the UE, and determining an enhanced dedicated transport channel transport format combination indication (E-TFCI) offset value according to data transmitted through the two data streams, wherein the grant value specifies a first transport block size for carrying a first data stream in a transport time interval (TTI), and wherein the E-TFCI offset value specifies a difference between the first transport block size and a second transport block size for carrying a second data stream such that the first data stream and the second data stream exhibit similar demodulation performance;
returning the grant value, the E-TFCI offset value, and a data stream identifier of the one data stream corresponding to the E-TFCI offset value to the UE; and
receiving, over the TTI, the first data stream and the second data stream, the first data stream being transported in containers having the first transport block size, and the second data stream being transported in containers having the second transport block size, wherein the first data stream and the second data stream exhibit similar demodulation performance by virtue of the difference between transport block sizes specified by the E-TFCI offset value.

7. The method according to claim 6, wherein determining the E-TFCI offset value comprises:
demodulating the data transmitted through the two data streams, and obtaining a demodulation performance difference of the data transmitted through the two data streams; and
determining the E-TFCI offset value according to the demodulation performance difference of the data transmitted through the two data streams.

8. A communication device, comprising:
a receiving module, configured to receive a grant value, an enhanced dedicated transport channel transport format combination indication (E-TFCI) offset value, and a data stream identifier corresponding to the E-TFCI offset value, wherein the grant value, the E-TFCI offset value, and the data stream identifier are returned by a Node B, and wherein the E-TFCI offset value is determined by the Node B according to data transmitted by the communication device through two data streams;
determining modules adapted to set transport block sizes for the two data streams in accordance with the E-TFCI offset value such that the two data streams exhibit similar demodulation performance, the determining modules including a first determining module configured to determine a first transport block size for carrying a first data stream in a TTI according to the grant value, wherein the first data stream is identified by the data stream identifier; and wherein the determining modules further include a second determining module configured to determine a second transport block size for carrying a second data stream in the TTI according to the first transport block size the E-TFCI offset value; and
a sending module configured to transmit, over the TTI, the first data stream using the first transport block size and the second data stream using the second transport block size, wherein the first data stream and the second data stream exhibit similar demodulation performance by virtue of a difference in transport block sizes specified by the E-TFCI offset value.

9. The communication device according to claim 8, wherein the first determining module comprises:
an obtaining unit, configured to obtain, according to the grant value received by the first receiving module, a grant value of the data stream in the TTI; and
a determining unit, configured to determine, according to the grant value obtained by the obtained unit, the transport block size of the data stream in the TTI.

10. The communication device according to claim 8, further comprising:
an identifying module, configured to identify whether the data transmitted through the two data streams in the TTI comprises scheduling grant service data,
wherein the second determining module is configured to determine the second transport block size according to the first transport block size and the E-TFCI offset value when the data transmitted through at least one of the two data streams comprises scheduling grant service data.

11. The communication device according to claim 10, further comprising:
a third determining module, configured to use the first transport block size to carry the second data stream in the TTI when the data transmitted through the two data streams does not comprise scheduling grant service data.

12. The communication device according to claim 11, further comprising:
a fourth determining module, configured to determine transmit power of the two data streams in the TTI according to the first transport block size
wherein the sending module is configured to send data to the Node B in the TTI using the determined transmit power.

13. A communication device, comprising:
a receiving module, configured to receive data transmitted by a User Equipment (UE) through two data streams;
an assigning module, configured to assign a grant value to the UE, wherein the grant value specifies a first transport block size for carrying a first data stream in a transport time interval (TTI);
a determining module, configured to determine an enhanced dedicated transport channel transport format combination indication (E-TFCI) offset value according to the data received by the receiving module, wherein the E-TFCI offset value specifies a difference between the first transport block size and a second transport block size for carrying a second data stream such that the first data stream and the second data stream exhibit similar demodulation performance;

a sending module, configured to send the grant value, the E-TFCI offset value, and a data stream identifier to the UE; and a receiving module configured to receive, over the TTI, the first data stream and the second data stream, the first data stream being transported in containers having the first transport block size, and the second data stream being transported in containers having the second transport block size, wherein the first data stream and the second data stream exhibit similar demodulation performance by virtue of the difference between transport block sizes specified by the E-TFCI offset value.

14. The communication device according to claim 13, wherein the determining module comprises:
   a demodulating unit, configured to demodulate the data received by the receiving module;
   a obtaining unit, configured to obtain a demodulation performance difference of the data received by the receiving module; and
   a determining unit, configured to determine the E-TFCI offset value of the data stream according to the demodulation performance difference obtained by the obtaining unit.

* * * * *